United States Patent
Arimoto

(10) Patent No.: US 7,659,472 B2
(45) Date of Patent: Feb. 9, 2010

(54) METHOD, APPARATUS, AND PROGRAM FOR ASSESSING SIMILARITY OF PERFORMANCE SOUND

(75) Inventor: Keita Arimoto, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 8 days.

(21) Appl. No.: 12/177,398

(22) Filed: Jul. 22, 2008

(65) Prior Publication Data
US 2009/0025538 A1    Jan. 29, 2009

(30) Foreign Application Priority Data
Jul. 26, 2007 (JP) ............... 2007-194485

(51) Int. Cl.
G10H 7/08    (2006.01)
A63H 5/00    (2006.01)

(52) U.S. Cl. .............. 84/600; 84/609; 84/649; 700/94

(58) Field of Classification Search ........... 84/600–602; 700/94
See application file for complete search history.

(56) References Cited

U.S. PATENT DOCUMENTS

| | | | |
|---|---|---|---|
| 5,633,985 A * | 5/1997 | Severson et al. | 704/267 |
| 5,692,097 A * | 11/1997 | Yamada et al. | 704/241 |
| 5,857,169 A * | 1/1999 | Seide | 704/256.7 |
| 5,913,259 A * | 6/1999 | Grubb et al. | 84/610 |
| 5,940,794 A * | 8/1999 | Abe | 704/253 |
| 6,111,183 A * | 8/2000 | Lindemann | 84/633 |
| 6,230,140 B1 * | 5/2001 | Severson et al. | 704/278 |
| 7,091,409 B2 * | 8/2006 | Li et al. | 84/634 |
| 7,245,767 B2 * | 7/2007 | Moreno et al. | 382/224 |
| 7,442,869 B2 * | 10/2008 | Zinato | 84/620 |
| 7,450,780 B2 * | 11/2008 | Roche et al. | 382/276 |
| 2002/0002899 A1 * | 1/2002 | Gjerdingen et al. | 84/667 |
| 2002/0026253 A1 * | 2/2002 | Rajan | 700/94 |
| 2002/0055913 A1 * | 5/2002 | Rajan | 706/19 |
| 2004/0231498 A1 * | 11/2004 | Li et al. | 84/634 |
| 2005/0021581 A1 * | 1/2005 | Lin | 708/426 |
| 2005/0044053 A1 * | 2/2005 | Moreno et al. | 706/20 |
| 2005/0152617 A1 * | 7/2005 | Roche et al. | 382/294 |
| 2006/0080088 A1 * | 4/2006 | Lee et al. | 704/207 |
| 2007/0208566 A1 * | 9/2007 | En-Najjary et al. | 704/269 |
| 2008/0053295 A1 * | 3/2008 | Goto et al. | 84/616 |
| 2008/0202321 A1 * | 8/2008 | Goto et al. | 84/616 |
| 2008/0262836 A1 * | 10/2008 | Goto et al. | 704/207 |
| 2009/0025538 A1 * | 1/2009 | Arimoto | 84/605 |

FOREIGN PATENT DOCUMENTS

JP    2001-125562    5/2001
JP    2004-341026    12/2004

* cited by examiner

Primary Examiner—David S. Warren
(74) Attorney, Agent, or Firm—Morrison & Foerster LLP

(57) ABSTRACT

A similarity assessment apparatus is provided for assessing a performance sound based on a model performance sound. In the apparatus, a probability density function generating unit divides data of a performance sound into a sequence of frames each having a predetermined temporal length, and generates a probability density function of a fundamental frequency for each frame of the performance sound. A probability density function providing portion provides a probability density function of a fundamental frequency for each frame of the model performance sound. A similarity assessment unit compares the generated probability density function of a frame of the performance sound with the provided probability density function of a frame of the model performance sound so as to assess a similarity between the performance sound and the model performance sound.

8 Claims, 6 Drawing Sheets

METHOD, APPARATUS, AND PROGRAM FOR ASSESSING SIMILARITY OF PERFORMANCE SOUND

BACKGROUND OF THE INVENTION

1. Technical Field

The present invention relates to a method, an apparatus, and a program for assessing a degree of similarity or accuracy of a music performance on practicing relative to a model performance.

2. Background Art

Various types of musical instruments having a performance self-training function have been provided in the past. Keyboard instruments are taken for instance. This type of musical instrument having the self-training function directs a user to a key, which should be depressed, by means of display or the like on a display device, senses a key depressed by the user, informs the user of whether a correct key has been depressed, and prompts the user to train himself/herself a keyboard performance. For realization of the self-training function, a key depressed by a user has to be sensed. This poses a problem in that a keyboard instrument devoid of a key scan mechanism cannot be provided with the self-training function. Consequently, a proposal has been made of a technology for collecting a performance sound, analyzing the frequency of the sound, and deciding whether a performance sound having a correct pitch designated in a musical note has been generated, without need for sensing a manipulation performed on the keyboard or the like. For example, according to a technology disclosed in a patent document 1, various piano sounds of different pitches are collected, the frequencies of the sounds are analyzed, and a power spectrum of a piano sound of each pitch is obtained and stored in advance. When a piano performance is conducted, a performance sound is collected, and the frequency of the sound is analyzed in order to obtain a power spectrum. Similarities of the power spectrum of the performance sound to the power spectra of various piano sounds of different pitches that are stored in advance are obtained. Based on the degrees of similarities, a decision is made on whether the performance has been conducted accurately as prescribed in a music score.

[Patent Document 1] JP-A-2004-341026

[Patent Document 2] Japanese Patent No. 3413634

However, the power spectrum of an instrumental sound has generally an overtone component at many frequency positions. The ratio of overtone components is diverse. When there are two instrumental sounds to be compared with each other, although their fundamental frequencies are different from each other, the shapes of their power spectra may incidentally resemble. Therefore, the technology in the patent document 1 poses a problem in that when a performance sound of a certain fundamental frequency is collected, a piano sound whose fundamental frequency is different from the fundamental frequency of the performance sound but whose power spectrum resembles in shape with the power spectrum thereof may be selected, and the pitch of the performance sound may be incorrectly identified.

SUMMARY OF THE INVENTION

The present invention addresses the foregoing situation. An object of the present invention is to provide a technological means capable of accurately assessing the similarity between the fundamental frequencies of a performance sound and a model performance sound.

The inventive similarity assessment method of a performance sound, comprises: a probability density function generating process of dividing one performance sound into a sequence of frames each having a predetermined temporal length and also dividing another performance sound to be compared with said one performance sound into another sequence of frames each having the predetermined temporal length, and generating a probability density function of a fundamental frequency for each frame of the respective performance sounds; and a similarity assessment process of comparing the probability density function of a frame of said one performance sound with the probability density function of a frame of said another performance sound so as to assess a similarity between said one performance sound and said another performance sound, wherein the probability density function generating process uses a plurality of tone models which simulate various harmonic structures of sounds generated from a musical instrument and defines a weighted mixture of the tone models corresponding to various fundamental frequencies, and recurrently updates and optimizes respective weight values of the tone models so that a frequency distribution of the weighted mixture of the tone models represents frequency components of the performance sound, thereby outputting the optimized weight values as the probability density function of the fundamental frequency of the performance sound.

According to the invention, the similarity between the fundamental frequencies of two performance sounds to be compared with each other can be highly precisely assessed.

DETAILED DESCRIPTION OF THE INVENTION

Referring to drawings, embodiments of the present invention will be described below.

<Overall Configuration>

Figure 1:
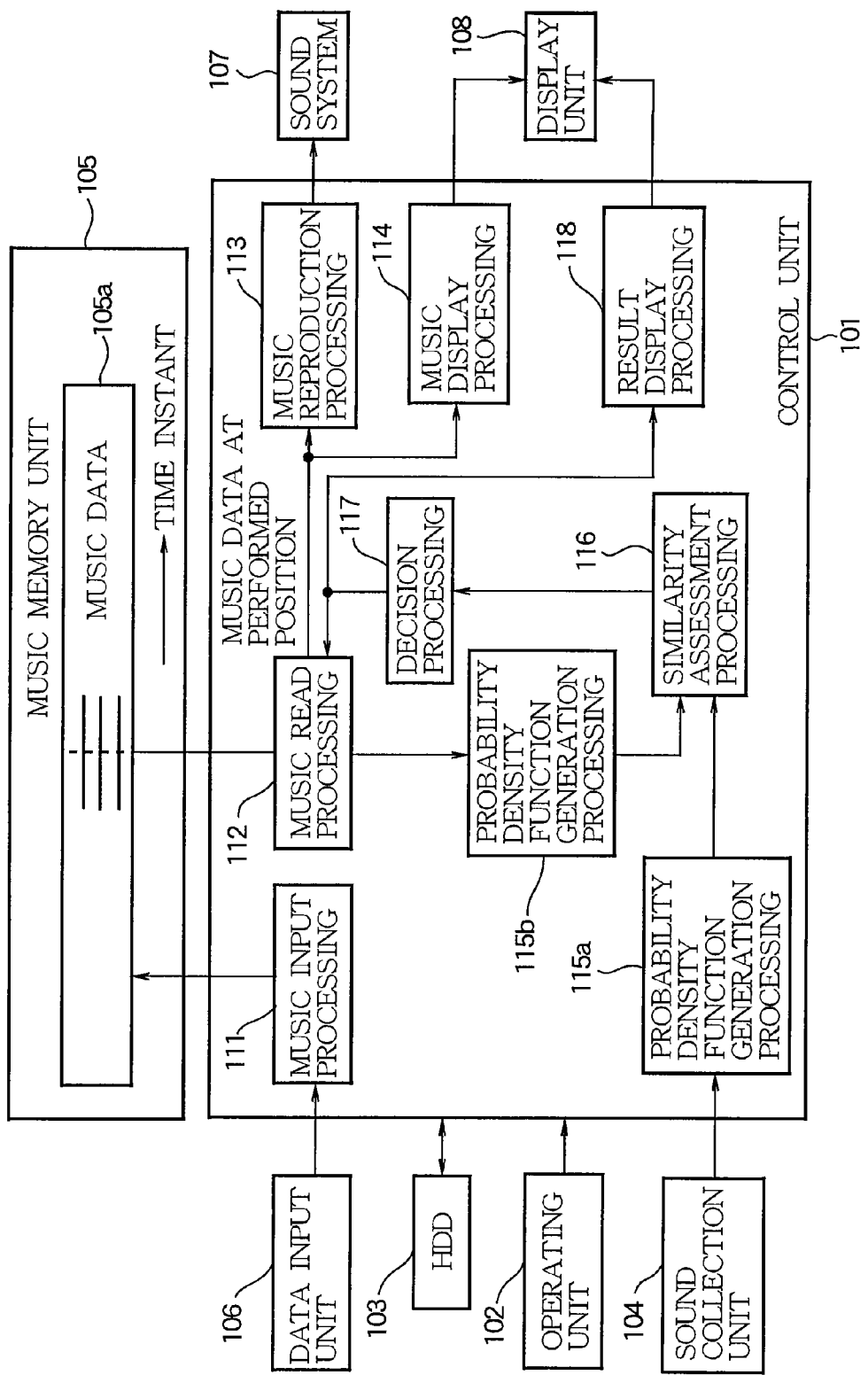
FIG. 1 is a block diagram showing the configuration of a training accompaniment system that is an embodiment of a similarity assessment apparatus for a performance sound in accordance with the present invention.

FIG. 1 is a block diagram showing the configuration of a training accompaniment system that is an embodiment of a similarity assessment apparatus for a performance sound according to the present invention. The training accompaniment system is a system that operates in a musical instrument, for example, a keyboard instrument, and that helps a user train himself/herself the performance on the musical instrument. In FIG. 1, a control unit 101 includes a CPU that runs various programs and a RAM or the like to be used as a work area by the CPU. In FIG. 1, shown in a box expressing the control unit 101 are the contents of processing of a program that implements a facility serving as the training accompaniment system of the present embodiment and that is included in the programs to be executed by the CPU of the control unit 101. An operating unit 102 is a device by which various commands or pieces of information are received from the user, and includes a group of control pieces such as panel switches arranged on the body of the musical instrument. An HDD (hard disk drive) 103 is a machine readable medium in which various programs and a database are stored. The program that implements the facility serving as the training accompaniment system of the present invention is also stored in the HDD 103. When the CPU of the control unit 101 is given a command, which signifies that the facility serving as the training accompaniment system should be activated, by manipulating the operating unit 102, the CPU of the control unit 101 loads the program, which implements the facility serving as the training accompaniment system, into the RAM, and runs the program.

A sound collection unit 104 includes a microphone that collects external sounds and outputs an analog acoustic signal, and an A/D converter or the like that converts the analog acoustic signal into a digital acoustic signal. In the present embodiment, the sound collection unit 104 is used as a sound connection means that collects a performance sound and outputs performance sound data.

A music memory unit 105 is a memory unit in which music data representing a model performance of a tune is stored, and formed with, for example, a RAM. The music data includes wave data and score data which are synchronously reproduced. The wave data is time-sequential sample data of a wave of a model performance sound of a tune, and has a label (temporal information), which indicates the timing of a bar line in a tune or timing of a beat therein, ad which is inserted to various parts thereof. Moreover, the score data is a set of image data items of a score associated with the labels. In the present embodiment, when the wave data is read from the music memory unit 105, if a label indicating the beginning of a certain section of the score is read, the image data of the score associated with the section is selected from the score data and read out. The music data includes as the wave data and score data the data items relevant to a melody part and those relevant to a bass part. A data input unit 106 is a means for externally fetching music data items of various tunes. For example, a device that reads music data from a storage medium such as an FD or an IC memory or a communication device that downloads music data from a server over a network is adopted as the data input unit 106.

A sound system 107 includes a D/A converter that converts a digital acoustic signal into an analog acoustic signal, and a loudspeaker that outputs the analog acoustic signal as sounds. A display unit 108 is, for example, a liquid crystal panel display. In the present embodiment, the display unit 108 is used as a means for performing display of an image of a score or display or the like of the result of a decision made on whether a performance conducted by a user is appropriate. Incidentally, the result of a decision is not limited to be displayed on the display but may be reported to a user through presentation of an alarm sound or vibrations.

Next, the contents of processing of a program that implements the facility serving as the training accompaniment system of the present embodiment will be described below. To begin with, music input processing 111 is the processing of acquiring music data 105a by means of the data input unit 106 according to a command given via the operating unit 102, and storing the music data in the music memory unit 105. Music read processing 112 is the processing of controlling a position which a user should perform (hereinafter, a performed position), and reading music data associated with the performed position from the music data 105a in the music memory unit 105. The control of the performed position in the music read processing 112 falls into two modes. In the first mode, when a user is performing a melody part or a bass part on a musical instrument, if the instrumental performance is close to a model performance and falls within an acceptance criterion, the performed position is advanced. The second mode is a mode in which the performed position is advanced at the normal tempo of the model performance. The mode by which the performed position is controlled in the music read processing 12 is determined with a command given via the operating unit 102. Moreover, the performing part of a user is determined with a command given via the operating unit 102.

Music reproduction processing 113 is the processing of selecting wave data of a part other than the user's performing part from music data of a performed position read through the music read processing 112, and feeding the wave data to the sound system 107. Music display processing 114 is the processing of selecting score data of a performing part selected by the user from the music data of the performed position outputted through the music read processing 112, and displaying a score represented by the score data on the display unit 108.

A module of probability density function generation processing 115a is the module of dividing performance sound data, which is outputted from the sound collection unit 104, into frames of a certain temporal length, and generating the probability density function of the fundamental frequency of a performance sound, which is represented by the performance sound data, in units of a frame. To be more specific, the probability density function generation processing 115a uses a plurality of tone models which simulate various harmonic structures of sounds generated from a musical instrument and defines a weighted mixture of the tone models corresponding to various fundamental frequencies, and recurrently updates and optimizes respective weight values of the tone models so that a frequency distribution of the weighted mixture of the tone models represents frequency components of the performance sound, thereby outputting the optimized weight values as the probability density function of the fundamental frequency of the performance sound.

Another module of probability density function generation processing 115b is the module of dividing wave data, which is included in music data read from the music memory unit 105, into frames having the same temporal length as the foregoing frames, and generating and outputting a second probability density function concerning the fundamental frequency of a model performance sound, which is represented by the wave data, in units of a frame according to the same arithmetic method as that employed in the probability density function generation processing 115a.

A module of similarity assessment processing 116 is the module of assessing the similarity between the first and second probability density functions, which are generated through the modules of probability density function generation processing 115a and 115b, in units of a frame. Decision processing 117 is the processing of deciding based on the similarity assessed through the similarity assessment processing 116 how close to the model performance the user's performance is. The result of the decision made through the decision processing 117 is passed to result display processing 118, and also passed to the aforesaid music read processing 112. In the music read processing 112, when the aforesaid first mode is selected by manipulating the operating unit 102, as long as the level of the user's performance skill obtained through the decision processing 117 exceeds a certain acceptance criterion, the performed position is controlled to be advanced to the position of the next performance sound. The result display processing 118 is the processing of displaying on the display unit 108 the result of the decision made through the decision processing 117, that is, how close to the model performance the user's performance is.

<Probability Density Function Generation Processing>

In the present embodiment, as an algorithm for the modules of probability density function generation processing 115a and 115b, the one disclosed in the patent document 2 is basically adopted. The contents will be described below.

<<1. Calculating an Instantaneous Frequency>>

In the modules of probability density function generation processing 115a and 115b, first, an input acoustic signal (performance sound data or wave data included in music data) is fed to a filter bank composed of multiple BPFs. The instantaneous frequency of the output signal of each of the BPFs included in the filter bank, which is a temporal derivative of a phase, is calculated (refer to "Phase Vocoder" by J. L. Flanagan and R. M. Golden (The BellSystem Technical J., Vol. 45, pp. 1493-1509, 1966)). Herein, the Flanagan's technique is used to interpret an output of short-time Fourier transform (STFT) as a filter bank output so as to highly efficiently calculate the instantaneous frequency. Assuming that STFT employing a window function h(t) for the input acoustic signal x(t) is given by an equation (1), an instantaneous frequency $\lambda(\omega, t)$ can be obtained according to an equation (2) below.

$$X(\omega, t) = \int_{-\infty}^{+\infty} x(\tau)h(t-\tau)e^{-j\omega\tau} d\tau \quad (1)$$
$$= a + jb$$

$$\lambda(\omega, t) = \omega + \frac{a\frac{\partial b}{\partial t} - b\frac{\partial a}{\partial t}}{a^2 + b^2} \quad (2)$$

Herein, h(t) denotes the window function that provides localization for a temporal frequency (for example, a time window produced by convoluting a second-order cardinal B-spline function to a Gaussian function that provides localization for an optimal temporal frequency).

In order to calculate the instantaneous frequency, wavelet transform may be employed. Herein, STFT is used to reduce the magnitude of a calculation. The employment of sole STFT leads to degradation in a time resolution and a frequency resolution over a certain frequency band. A multi-rate filter bank is constructed (refer to "A Theory of Multirate Filter Banks" by M. Vetterli (IEEE Trans. on ASSP, Vol. ASSP-35, No. 3, pp. 356-372, 1987)) in order to obtain reasonable time and frequency resolutions under the restriction that the calculation should be able to be executed in real time.

$$\Psi_p^{(t)}(\omega) = \begin{cases} |X(\omega, t)| & \text{if } \omega \in \Psi_f^{(t)} \\ 0 & \text{otherwise} \end{cases} \quad (4)$$

<<3. Limiting a Frequency Band>>

In this processing, sampled frequency components are weighted in order to limit a frequency band. Two BPFs are prepared for a melody part and a bass part. The melody part BPF can let a principal fundamental wave component and many harmonic components of a typical melody part therethrough, and blocks a frequency band, which is close to the fundamental frequency and in which overlap frequently occurs, to some extent. On the other hand, the bass part BPF can let a principal fundamental frequency and many harmonic components of a typical bass line therethrough, and blocks a frequency band, in which any other performance part dominates over the bass part, to some extent.

In the present embodiment, a frequency in a logarithmic scale is expressed in the unit of cent (which is a scale originally indicating a pitch difference (musical interval)) A frequency fHz expressed in the unit of Hz is converted into a frequency frcent expressed in the unit of cent as follows:

<<2. Sampling a Candidate for a Frequency Component>>

A candidate for a frequency component is sampled based on the mapping from the center frequency of a filter to an instantaneous frequency (refer to "Pitch detection using the short-term phase spectrum" by F. J. Charpentier (Proc. of ICASSP 86, pp. 113-116, 1986)). The mapping from the center frequency $\omega$ of a certain STFT filter to the instantaneous frequency $\lambda(\omega, t)$ of the output of the filter will be discussed. If a frequency component of a frequency $\phi$ is found, $\phi$ is located at the fixed point for the mapping. The instantaneous frequency values in the vicinity of the fixed point are nearly constant. Namely, the instantaneous frequencies $\psi f^{(t)}$ of all frequency components can be sampled according to an equation below.

$$\Psi_f^{(t)} = \left\{ \Psi \mid \lambda(\phi, t) - \phi = 0, \frac{\partial}{\partial \phi}(\lambda(\phi, t) - \phi) < 0 \right\} \quad (3)$$

The powers of the frequency components are obtained as values of an STFT power spectrum at the frequencies of $\psi f^{(t)}$. Consequently, a power distribution function $\psi p^{(t)} (\omega)$ of a frequency component can be defined as follows:

$$f_{cent} = 1200 \log_2 \frac{f_{Hz}}{REF_{Hz}} \quad (5)$$

$$REF_{Hz} = 440 \times 2^{\frac{3}{12}-5} \quad (6)$$

Semitones in the equal temperament are equivalent to 100 cent, and one octave is equivalent to 1200 cent.

Assuming that BPF(x) denotes the frequency response of a BPF at a frequency x cent and $\psi' p^{(t)} (x)$ denotes a power distribution function of a frequency component, a frequency component having passed through the BPF is expressed as $BPF(x)\psi' p^{(t)} (x)$. Here, $\psi' p^{(t)} (x)$ expresses the same function as $\psi p^{(t)} (\omega)$ does except that a frequency axis is graduated in the unit of cent. For a preparation for the next stage, a probability density function $p\psi^{(t)} (x)$ of the frequency component having passed through the BPF is defined.

$$p_\Psi^{(t)}(x) = \frac{BPF(x)\Psi_p'^{(t)}(X)}{Pow^{(t)}} \quad (7)$$

Herein, $Pow^{(t)}$ denotes the sum total of powers of frequency components having passed through the BPF and is provided by an equation below.

$$Pow^{(t)} = \int_{-\infty}^{+\infty} BPF(x)\Psi_p'^{(t)}(x)dx \quad (8)$$

<<4. Estimating a Probability Density Function of a Fundamental Frequency>>

In the present processing, a probability density function of a fundamental frequency signifying how relatively dominant each harmonic structure is over a candidate for a frequency component having passed through a BPF is obtained. For this purpose, in the present embodiment, a probability density function $p\psi^{(t)}(x)$ of a frequency component is thought to be produced from a mixture distribution model (a model of a weighted sum) of a probability distribution (tone model) that is a model of a sound having a harmonic structure. Assuming that $p(x|F)$ denotes a probability density function of a tone model whose fundamental frequency is F, its mixture distribution model $p(x;\theta^{(t)})$ can be defined with an equation below.

$$p(x; \theta^{(t)}) = \int_{-\infty}^{+\infty} w^{(t)}(F) p(x|F) dF \quad (9)$$

$$\theta^{(t)} = \{w^{(t)}(F) | Fl \leq F \leq Fh\} \quad (10)$$

Herein, Fh and Fl denote the upper limit of a permissible fundamental frequency and the lower limit thereof, and are determined with the passband of a BPF. Moreover, $w^{(t)}(F)$ denotes a weight for a tone model $p(x|F)$ satisfying an equation below.

$$\int_{Fl}^{Fh} \omega^{(t)}(F) df = 1 \quad (11)$$

Since it is impossible to tentatively determine the number of sound sources in advance for an acoustic signal in the real world such as a CD or the like, it is important to produce a model in consideration of the possibilities of various fundamental frequencies. As long as a model parameter $\theta^{(t)}$ can be estimated as if an observed frequency component $p\psi^{(t)}(x)$ were produced from a model $p(x;\theta^{(t)})$, $p\psi^{(t)}(x)$ can be regarded as having been decomposed into individual tone models. A weight $w^{(t)}(F)$ for a tone model of each fundamental frequency F can be interpreted as a probability density function $pFO^{(t)}(F)$ of the fundamental frequency F.

$$p_{FO}^{(t)}(F) = w^{(t)}(F) \quad (Fl \leq F \leq Fh) \quad (12)$$

Specifically, in a mixture distribution, as a certain tone model $p(x|F)$ gets more and more dominant (that is, $w^{(t)}(F)$ gets larger), the probability of the fundamental frequency F of the tone model gets higher in $pFO^{(t)}(F)$.

The above description demonstrates that when the probability density function $p\psi^{(t)}(x)$ is observed, a problem of estimating the parameter $\theta^{(t)}$ in the model $p(x;\theta^{(t)})$ should be solved. The maximum likelihood estimator of $\theta^{(t)}$ is obtained by maximizing an average logarithmic likelihood defined with an equation below.

$$\int_{-\infty}^{+\infty} p\psi^{(t)}(x) \log p(x; \theta^{(t)}) dx \quad (13)$$

Since there is difficulty in analytically solving the problem of maximization, an EM (expectation-maximization) algorithm is used to estimate $\theta^{(t)}$. The EM algorithm is an iterative algorithm for estimating the maximum likelihood from imperfect observation data (in this case, $p\psi^{(t)}(x)$) by alternately repeatedly applying an E (expectation) step and an M (maximization) step. In the present embodiment, by repeating the EM algorithm, the most likely weight parameter $\theta^{(t)} = \{w^{(t)}(F) | Fl \leq F \leq Fh\}$ is obtained on the assumption that the probability density function $p\psi^{(t)}(x)$ of a frequency component having passed through a BPF is regarded as a mixture distribution having multiple tone models $p(x|F)$, which are associated with various fundamental frequencies F, weighted and added up. At every time of repeating the EM algorithm, a previous parameter estimate $\theta old^{(t)}$ $(=\{wold^{(t)}(F)|Fl \leq F \leq Fh\})$ for the parameter $\theta^{(t)}(=\{w^{(t)}(F)|Fl \leq F \leq Fh\})$ is updated in order to obtain a new (more likely) parameter estimate $\theta new^{(t)}$ $(=\{wnew^{(t)}(F)|Fl \leq F \leq Fh\})$. As an initial value of $\theta old^{(t)}$, the last estimate at an immediately preceding time instant t-1 is adopted. A recurrence formula for obtaining the new parameter estimate $\theta new^{(t)}$ from the previous parameter estimate $\theta old^{(t)}$ is provided below. For the details of a deduction process for the recurrence formula, refer to the patent document 2.

$$w_{new}^{(t)} = \int_{-\infty}^{+\infty} p_{\Psi}^{(t)}(x) \frac{w_{old}^{(t)}(F) p(x|F)}{\int_{Fli}^{Fhi} w_{old}^{(t)}(\eta) p(x|\eta) d\eta} dx \quad (14)$$

In the modules of probability density function generation processing 115a and 115b, when the parameter $\theta^{(t)}$ $(=\{w^{(t)}(F)|Fl \leq F \leq Fh\})$ has converged due to repetition of the above recurrence formula, the parameter $\theta^{(t)}(=\{w^{(t)}(F)|Fl \leq F \leq Fh\})$ is outputted as a probability density function of a fundamental frequency of an input sound (a performance sound represented by performance sound data or wave data included in music data) The modules of probability density function generation processing 115a and 115b in the present embodiment have been described so far.

<Similarity Assessment Processing>

In the similarity assessment processing 116, the similarity between first and second probability density functions obtained through the modules of probability density function generation processing 115a and 115b is assessed in units of a frame. As for a method of similarity assessment, various modes are conceivable. For avoiding an iterative description, the detail of the method will be revealed in a description of operations by the present embodiment.

<Operations By The Present Embodiment>

Next, the operations of the present embodiment will be described below. In the music read processing 112 in the present embodiment, a performed position in a tune is always monitored, and music data associated with the performed position is read from the music memory unit 105 and passed to the music reproduction processing 113 and music display processing 114. Moreover, in the music read processing 112, wave data for a user's performing part included in the music data associated with the performed position is passed to the probability density function generation processing 115b.

In the music reproduction processing 113, out of the music data passed from the music read processing 112, wave data for any part other than the user's performing part is sent to the sound system 107, and the sound system 107 is allowed to reproduce the part. Moreover, in the music display processing 114, the display unit 108 is allowed to display an image of a score represented by score data for the user's performing part out of the music data passed from the music read processing 112.

After a user conducts an instrumental performance, when the performance sound is collected by the sound collection unit 104, performance sound data representing the performance sound is passed to the probability density function generation processing 115a. In the probability density function generation processing 115a, the performance sound data is divided into frames of a certain temporal length, and a probability density function of a fundamental frequency of a performance sound represented by the performance sound data is generated in units of a frame. To be more specific, the probability density function generation processing 115a uses a plurality of tone models which simulate various harmonic structures of sounds generated from a musical instrument and defines a weighted mixture of the tone models corresponding to various fundamental frequencies, and recurrently updates and optimizes respective weight values of the tone models so that a frequency distribution of the weighted mixture of the tone models represents frequency components of the performance sound, thereby outputting the optimized weight values as the first probability density function of the fundamental frequency of the performance sound.

On the other hand, in the probability density function generation processing 115*b*, wave data passed from the music read processing 112 is divided into frames of the same temporal length as the above frames, and a second probability density function relevant to the fundamental frequency of a model performance sound represented by the wave data is generated in units of a frame. The algorithm for generating the probability density function is identical to the algorithm for generating a probability density function in the probability density function generation processing 115*a*.

In the similarity assessment processing 116, the similarity between the first and second probability density functions generated through the modules of probability density function generation processing 115*a* and 115*b* is assessed in units of a frame. As for the assessment of the similarity, various modes are conceivable.

Figure 2:
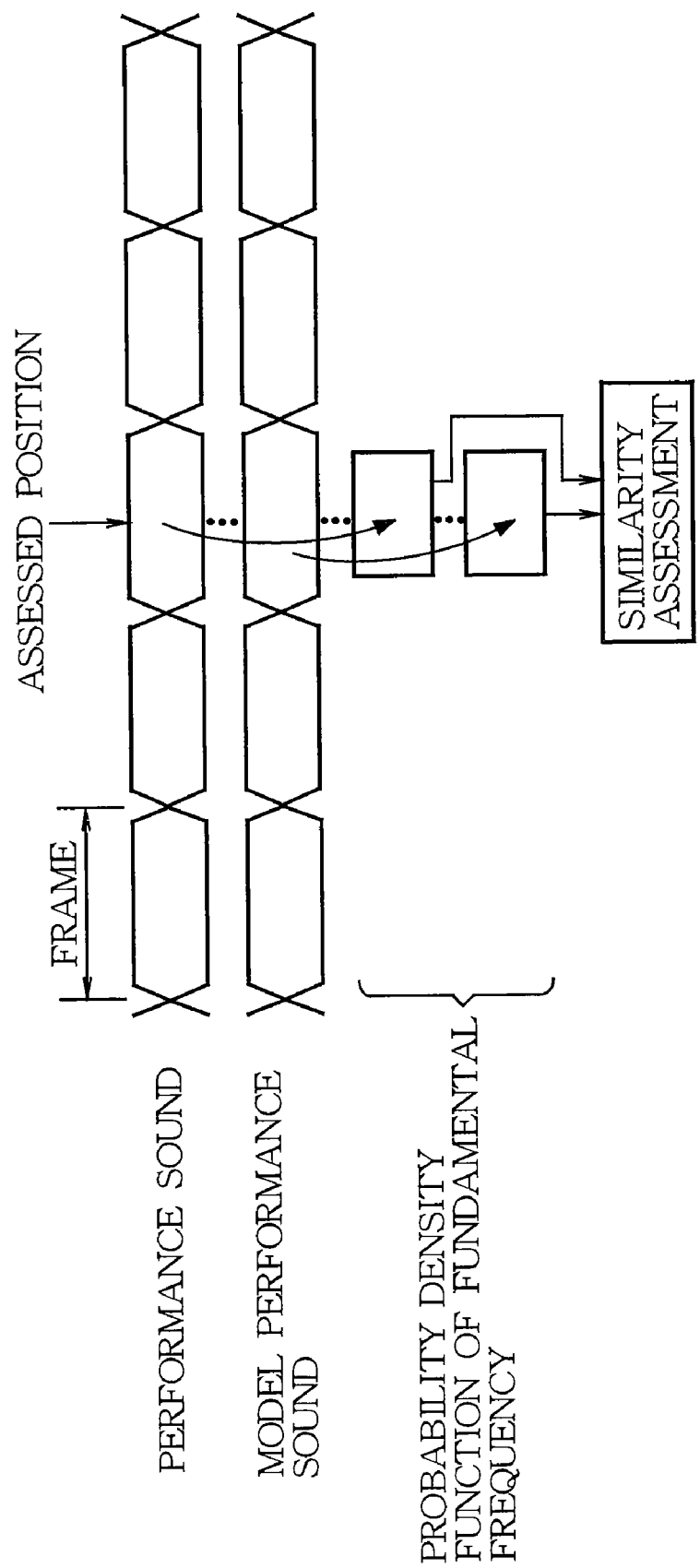
FIG. 2 shows a first mode of a similarity assessment processing in the embodiment.

FIG. 2 shows a first mode of similarity assessment. In the first mode, an assessed position is changed from one to another in pursuit of a performed position. As illustrated, the similarity between the first probability density function relevant to the fundamental frequency of a performance sound belonging to a frame of an assessed position and the second probability density function relevant to the fundamental frequency of a model performance sound belonging to the frame of the assessed position is calculated. The similarity is regarded as the similarity at the assessed position between the fundamental frequencies of the performance sound and model performance sound. The first mode has the following merits: the similarity between the fundamental frequencies of the performance sound and model performance sound can be assessed in detail in units of a frame; and the result of the assessment can be provided for a user. Moreover, the first mode has the merit that processing is simple.

Figure 3:
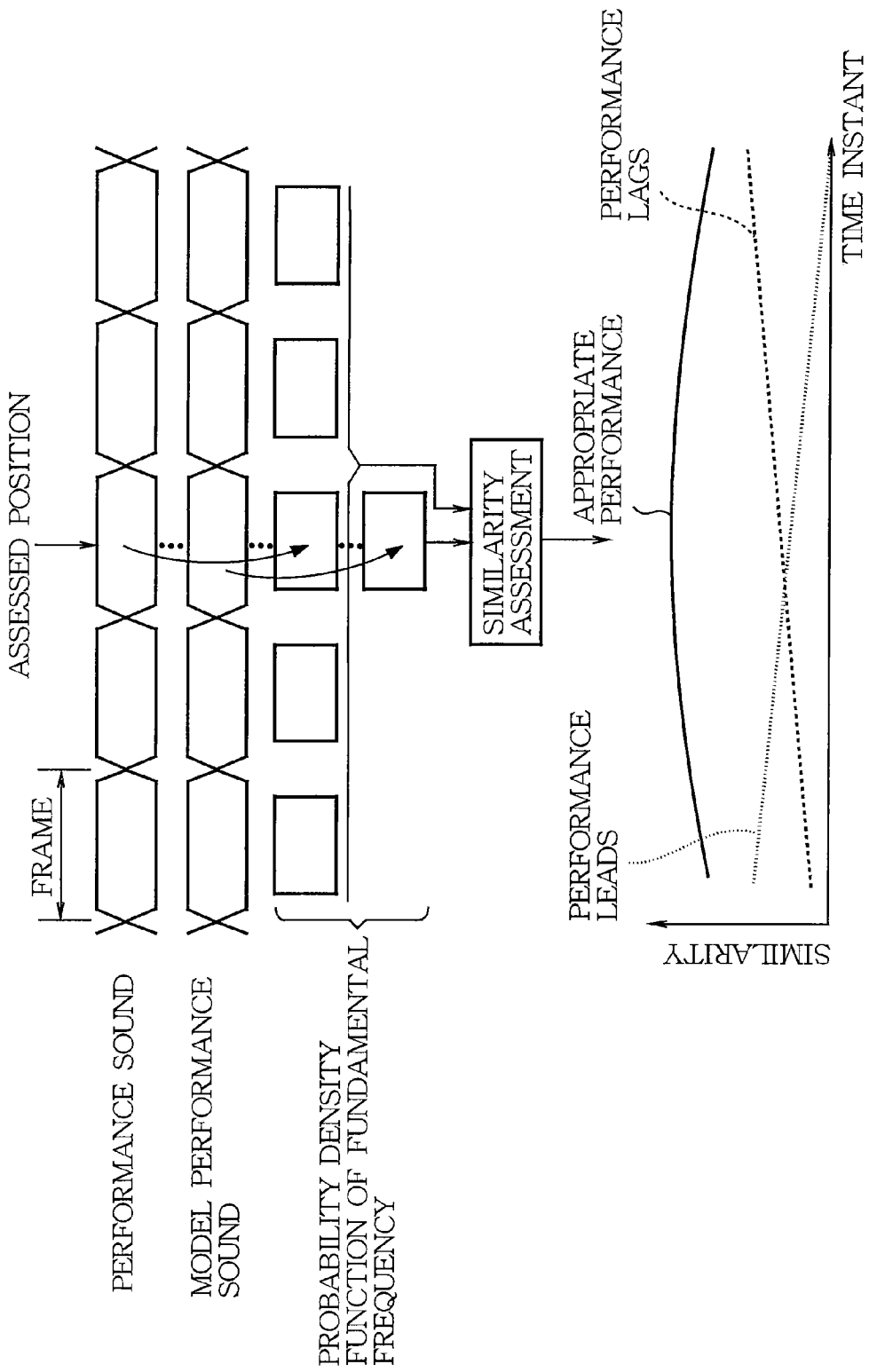
FIG. 3 shows a second mode of the similarity assessment processing in the embodiment.

FIG. 3 shows a second mode of similarity assessment. In the second mode, a degree of the similarity between each of the probability density functions of a performance sound on a predetermined number of frames including in the middle (for example, in the center) thereof a frame of an assessed position at which the probability density function of a model performance sound is calculated. The maximum degree of similarity is regarded as the similarity at the assessed position between the performance sound and the model performance sound.

In the second mode, assuming that a live performance accurately follows a model performance and neither leads nor lags behind the model performance in terms of the phase, the similarity between the probability density function of the fundamental frequency of the performance sound at an assessed position and the probability density function of the fundamental frequency of the model performance sound at the assessed position becomes the maximum among the similarities calculated on the predetermined number of frames. However, when the live performance leads the model performance, the maximum degree of the similarity is obtained between the probability density function of the fundamental frequency of the performance sound on a frame temporally preceding the assessed position and the probability density function of the fundamental frequency of the model performance on the frame of the assessed position. On the other hand, when the performance lags behind the model performance, the maximum degree of the similarity is obtained between the probability density function of the fundamental frequency of the performance sound on a frame temporally succeeding the assessed position and the probability density function of the fundamental frequency of the model performance sound on the frame of the assessed position. Thus, the degree of whether the performance leads or lags behind the model performance is manifested as an interval (number of frames) between the frame which maximize the similarity and the frame of the assessed position. In the second mode, the number of frames between the frame which maximize the similarity and the frame of the assessed position is outputted as information representing the degree of temporal matching of the performance with respect to the model performance. The second mode has the merit that when the performance exhibits a slight phase shift with respect to the model performance, the phase shift can be alleviated and similarity can be assessed appropriately. If a user is provided with information on the result of the similarity assessment made in the second mode, the user can learn in which direction and to what degree a phase shift has occurred at each position in a tune. This helps the user upgrade his/her performance.

Various modes are conceivable in terms of what is adopted as a similarity. In the first mode, the probability density function of the fundamental frequency of a performance sound and the probability density function of the fundamental frequency of a model performance sound are used to calculate an amount of K-L information. The amount of K-L information can be adopted as a similarity.

Figure 4:
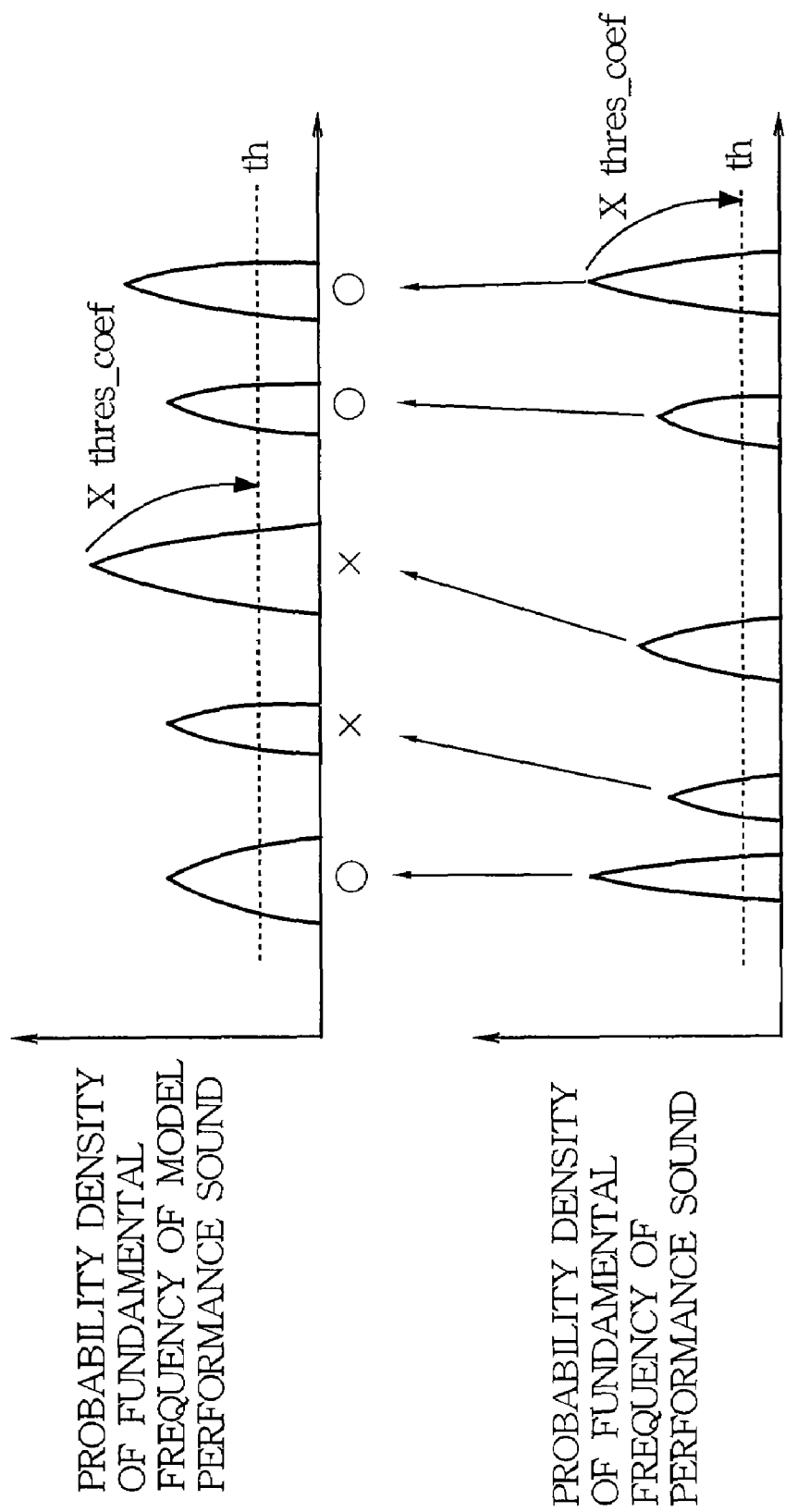
FIG. 4 shows a mode of a similarity calculation method in the embodiment.

In the second mode, peaks exhibited by two probability density functions are compared with each other. The higher the closeness between the peaks is, the higher the similarity between the probability density functions is. FIG. 4 shows similarity assessment in the second mode. First, the maximum values exhibited by the probability density function of the fundamental frequency of a performance sound and the probability density function of the fundamental frequency of a model performance sound are multiplied by a coefficient thres_coef that is a positive value smaller than 1 in order to obtain thresholds th. Thereafter, in each of the probability density functions, a part exceeding the threshold th is regarded as a peak of probability densities. Among peaks of probability densities in the performance sound, the number of peaks N1 whose differences in frequency from peaks of probability densities in the model performance sound fall within a permissible range is obtained. The result of division of the number of peaks N1 by the number of peaks N2 of the probability density in the performance sound, N1/N2, is regarded as the similarity between the probability density function of the fundamental frequency of the performance sound and the probability density function of the fundamental frequency of the model performance sound. Otherwise, a similarity may be calculated according to a method described below. First, the sum total H1 of the heights of peaks, whose differences in frequency from peaks of probability densities in a model performance sound fall within a permissible range, out of peaks of probability densities in a performance sound is worked out. Thereafter, the sum total H2 of the heights of the peaks of the probability densities in the performance sound is worked out. H1/H2 is regarded as the similarity between the probability densify function of the fundamental frequency of the performance sound and the probability density function of the fundamental frequency of the model performance sound.

In the decision processing 117, based on the result of the similarity assessment processing 116, a decision is made on how close to the pitch of a model performance sound the pitch of a performance sound is. In the result display processing 118, the result of the decision in the decision processing 117 is displayed on the display unit 108.

In the present embodiment, the foregoing processing is repeated while a performed position is advanced.

As described so far, in the present embodiment, for each of a performance sound and a model performance sound that are compared with each other, a probability density function of a fundamental frequency is obtained in units of a frame. The similarity between the probability density functions is assessed. Consequently, the similarity between the fundamental frequencies of the performance sound and model performance sound can be highly precisely assessed. Moreover, in the present embodiment, since the similarity between the probability density functions of the fundamental frequencies of the performance sound and model performance sound is assessed, unlike the technology disclosed in the patent document 1, the similarity of a performance can be appropriately assessed even in a situation in which a performance of simultaneously producing multiple sounds is conducted.

OTHER EMBODIMENTS

One embodiment of the present invention has been described so far. Other embodiments are conceivable in the present invention. Examples will be presented below.

(1) As the similarity between the probability density function of the fundamental frequency of a performance sound and the probability density function of the fundamental frequency of a model performance sound, what are described below may be adopted.

Figure 5:
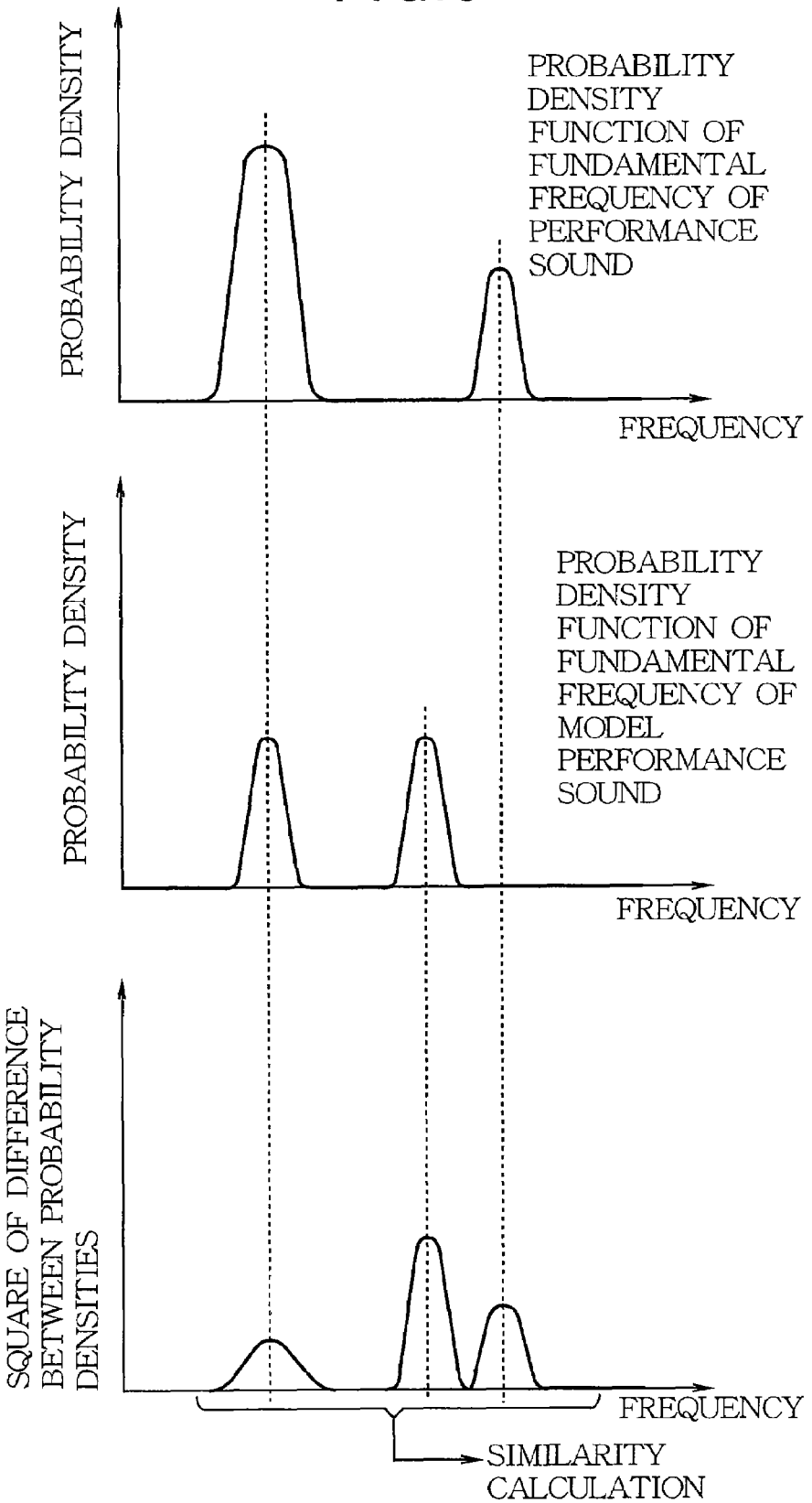
FIG. 5 shows another mode of the similarity calculation method.

(1-1) A root mean square (RMS) between two probability density functions, that is, as shown in FIG. 5, a square of a difference between a probability density in the probability density function of the fundamental frequency of a performance sound and a probability density in the probability density function of the fundamental frequency of a model performance is integrated over an entire frequency band. An inverse number of a square root of a quotient of the result of the integration by a predetermined constant C is regarded as a similarity. Instead of the inverse number of the square root, a value obtained by subtracting the square root from a predetermined maximum value may be regarded as a similarity.

Figure 6:
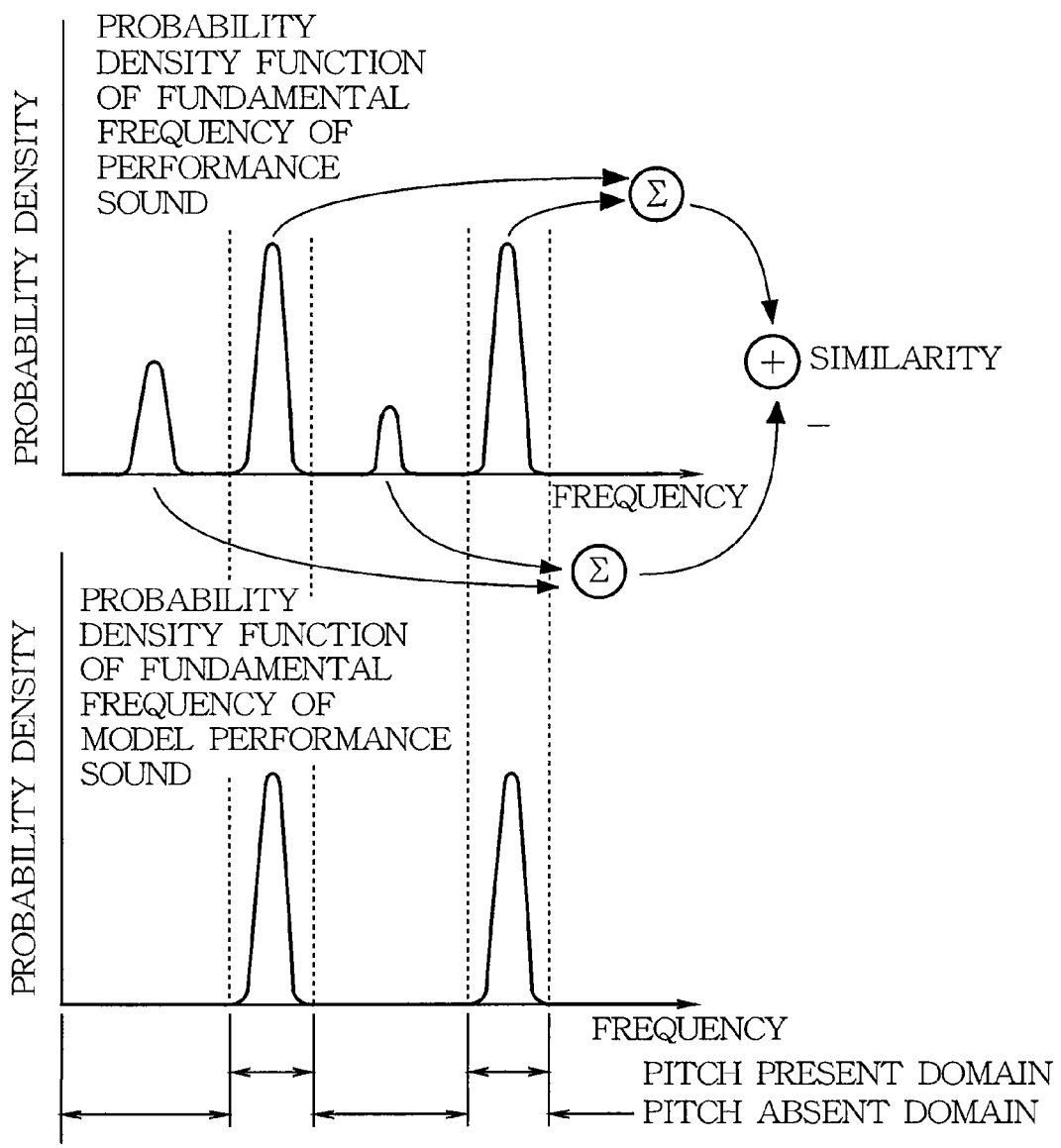
FIG. 6 shows another mode of the similarity calculation method.

(1-2) As shown in FIG. 6, a frequency band is divided into pitch present domains in which the probability densities of the fundamental frequency of a model performance sound are high, and pitch absent domains in which the probability densities of the fundamental frequency of a model performance sound are nearly 0. In the probability density function of the fundamental frequency of a performance sound obtained through the probability density function generation processing 115a, the sum total of probability densities in parts belonging to the pitch present domains, and the sum total of probability densities in parts belonging to the pitch absent domains are worked out. A value obtained by subtracting the latter from the former may be regarded as a similarity.

(1-3) Any characteristic quantity may be sampled from each of the probability density function of the fundamental frequency of a performance sound and the probability density function of the fundamental frequency of a model performance sound. A quantity adopting a product between the characteristic quantities, a power, or any of various mathematical functions may be regarded as a similarity so that the probability density function of the fundamental frequency of the performance sound and the probability density function of the target fundamental frequency can be easily discriminated from each other.

(1-4) For example, two out of the aforesaid methods are used to obtain two similarities (which shall be first and second similarities). A third similarity obtained by linearly combining the first and second similarities may be adopted as a similarity for use in deciding whether a performance sound exhibits a correct pitch.

(2) As for a model performance sound, the probability density function of the fundamental frequency is obtained in advance in units of a frame using the same algorithm as that in the probability density function generation processing 115a, and stored in, for example, the music memory unit 105. Synchronously with the output of the probability density function of the fundamental frequency of a performance sound in units of a frame through the probability density function generation processing 115a, the probability density function of the fundamental frequency of a model performance sound may be read from the music memory unit 105 and fed to the similarity assessment processing 116. This mode has the merit that since the probability density function generation processing 115b need not be executed in units of a frame, the magnitude of an arithmetic operation per frame can be reduced.

(3) In the aforesaid embodiment and the mode (2), the length of a frame may be different between a model performance sound and a performance sound. For example, in the mode (2), a performance sound may not be able to be divided into frames of the same length as that of frames into which the model performance sound is divided, and then processed by reason that the processing ability of the training accompaniment system is low. In this case, the performance sound may be divided into frames whose length is m times larger than the length of the frames of the model performance sound. The similarity between the probability density function of the fundamental frequency of the performance sound on one frame and a typical one of the probability density functions of the fundamental frequency of the model performance sound on m frames occupying the same time zone may be assessed.

(4) In the aforesaid embodiment, a melody part and a bass part are separately dealt with but need not always be separated from each other. Namely, for each of a performance sound and a model performance sound in both of which the melody part and bass part coexist, the probability density function of the fundamental frequency may be obtained. The similarity between the probability density functions may be assessed.

The inventive similarity assessment apparatus is provided for assessing a performance sound based on a model performance sound. In the inventive similarity assessment apparatus, a probability density function generating unit 115a divides data of a performance sound into a sequence of frames each having a predetermined temporal length, and generates a probability density function of a fundamental frequency for each frame of the performance sound. The probability density function generating unit 115a uses a plurality of tone models which simulate various harmonic structures of sounds generated from a musical instrument and defines a weighted mixture of the tone models corresponding to various fundamental frequencies, and recurrently updates and optimizes respective weight values of the tone models so that a frequency distribution of the weighted mixture of the tone models represents frequency components of the performance sound, thereby outputting the optimized weight values as the probability density function of the fundamental frequency of the performance sound. A probability density function providing portion (105, 112, 115b) provides a probability density function of a fundamental frequency for each frame of the model performance sound. A similarity assessment unit 116 compares the generated probability density function of a frame of the performance sound with the provided probability density function of a frame of the model performance sound so as to assess a similarity between the performance sound and the model performance sound. A collecting unit 104 collects the performance sound and outputs data of the collected performance sound in realtime basis to the probability density generating unit 115a so that the probability density generating unit 115a generates the probability density function of the collected performance sound in realtime basis.

The probability density function providing portion (105, 112, 115*b*) is comprised of a memory unit 105 that stores music data 105*a* representing the model performance sound, a reading unit 112 that reads out the music data 105*a* from the memory unit 105, and another probability density function generating unit 115*b* that divides the read music data representing the model performance sound into a sequence of frames each having the predetermined temporal length and generates the probability density function of the fundamental frequency for each frame of the model performance sound.

Alternatively, the probability density function providing portion is comprised of a memory unit that stores the probability density function of the fundamental frequency for each frame of the model performance sound, and a reading unit that reads out the probability density function of the model performance sound from the memory unit and provides the read probability density function of the model performance sound to the similarity assessment unit.

The similarity assessment unit 116 calculates a degree of the similarity of the probability density functions between a frame of the model performance sound and each of a predetermined number of frames of the performance sound containing a frame corresponding to the frame of the model performance sound, and outputs a maximum one of the calculated values as the degree of the similarity. Further, the similarity assessment unit 116 calculates a time difference between a frame of the performance sound which brings about the maximum one of the calculated values and the frame of the model performance sound, and outputs the time difference as a degree of temporal matching between the performance sound and the model performance sound.

The invention claimed is:

1. A similarity assessment method of a performance sound, comprising:
   a probability density function generating process of dividing one performance sound into a sequence of frames each having a predetermined temporal length and also dividing another performance sound to be compared with said one performance sound into another sequence of frames each having the predetermined temporal length, and generating a probability density function of a fundamental frequency for each frame of the respective performance sounds; and
   a similarity assessment process of comparing the probability density function of a frame of said one performance sound with the probability density function of a frame of said another performance sound so as to assess a similarity between said one performance sound and said another performance sound, wherein
   the probability density function generating process uses a plurality of tone models which simulate various harmonic structures of sounds generated from a musical instrument and defines a weighted mixture of the tone models corresponding to various fundamental frequencies, and recurrently updates and optimizes respective weight values of the tone models so that a frequency distribution of the weighted mixture of the tone models represents frequency components of the performance sound, thereby outputting the optimized weight values as the probability density function of the fundamental frequency of the performance sound.

2. A similarity assessment apparatus for assessing a performance sound based on a model performance sound, comprising:
   a probability density function generating unit that divides data of a performance sound into a sequence of frames each having a predetermined temporal length, and generates a probability density function of a fundamental frequency for each frame of the performance sound,
   wherein the probability density function generating unit uses a plurality of tone models which simulate various harmonic structures of sounds generated from a musical instrument and defines a weighted mixture of the tone models corresponding to various fundamental frequencies, and recurrently updates and optimizes respective weight values of the tone models so that a frequency distribution of the weighted mixture of the tone models represents frequency components of the performance sound, thereby outputting the optimized weight values as the probability density function of the fundamental frequency of the performance sound;
   a probability density function providing portion that provides a probability density function of a fundamental frequency for each frame of the model performance sound; and
   a similarity assessment unit that compares the generated probability density function of a frame of the performance sound with the provided probability density function of a frame of the model performance sound so as to assess a similarity between the performance sound and the model performance sound.

3. The similarity assessment apparatus according to claim 2, further comprising a collecting unit that collects the performance sound and outputs data of the collected performance sound in realtime basis to the probability density generating unit so that the probability density generating unit generates the probability density function of the collected performance sound in realtime basis.

4. The similarity assessment apparatus according to claim 2, wherein the probability density function providing portion comprises:
   a memory unit that stores music data representing the model performance sound;
   a reading unit that reads out the music data from the memory unit; and
   another probability density function generating unit that divides the read music data representing the model performance sound into a sequence of frames each having the predetermined temporal length and generates the probability density function of the fundamental frequency for each frame of the model performance sound, wherein
   said another probability density function generating unit uses a plurality of tone models which simulate various harmonic structures of sounds generated from a musical instrument and defines a weighted mixture of the tone models corresponding to various fundamental frequencies, and recurrently updates and optimizes respective weight values of the tone models so that a frequency distribution of the weighted mixture of the tone models represents frequency components of the model performance sound, thereby outputting the optimized weight values as the probability density function of the fundamental frequency of the model performance sound.

5. The similarity assessment apparatus according to claim 2, wherein the probability density function providing portion comprises:
   a memory unit that stores the probability density function of the fundamental frequency for each frame of the model performance sound, wherein the stored probability density function is provisionally prepared by using a plurality of tone models which simulate various harmonic structures of sounds generated from a musical instrument and defining a weighted mixture of the tone models corresponding to various fundamental frequencies, and by recurrently updating and optimizing respective weight values of the tone models so that a frequency distribution of the weighted mixture of the tone models represents frequency components of the model performance sound, and thereby outputting the optimized weight values as the probability density function of the fundamental frequency of the model performance sound; and a reading unit that reads out the probability density function of the model performance sound from the memory unit and provides the read probability density function of the model performance sound to the similarity assessment unit.

6. The similarity assessment apparatus according to claim 2, wherein the similarity assessment unit calculates a degree of the similarity of the probability density functions between a frame of the model performance sound and each of a predetermined number of frames of the performance sound containing a frame corresponding to the frame of the model performance sound, and outputs a maximum one of the calculated values as the degree of the similarity.

7. The similarity assessment apparatus according to claim 6, wherein the similarity assessment unit calculates a time difference between a frame of the performance sound which brings about the maximum one of the calculated values and the frame of the model performance sound, and outputs the time difference as a degree of temporal matching between the performance sound and the model performance sound.

8. A machine readable medium for use in a computer, the medium containing program instructions executable by the computer to perform processes of assessing a performance sound based on a model performance sound, wherein the processes comprise:

a probability density function generating process of dividing data of a performance sound into a sequence of frames each having a predetermined temporal length, and generating a probability density function of a fundamental frequency for each frame of the performance sound, wherein the probability density function generating process uses a plurality of tone models which simulate various harmonic structures of sounds generated from a musical instrument and defines a weighted mixture of the tone models corresponding to various fundamental frequencies, and recurrently updates and optimizes respective weight values of the tone models so that a frequency distribution of the weighted mixture of the tone models represents frequency components of the performance sound, thereby outputting the optimized weight values as the probability density function of the fundamental frequency of the performance sound;

a probability density function acquiring process of acquiring a probability density function of a fundamental frequency for each frame of the model performance sound; and a similarity assessment process of comparing the generated probability density function of a frame of the performance sound with the acquired probability density function of a frame of the model performance sound so as to assess a similarity between the performance sound and the model performance sound.

* * * * *